United States Patent
Ashwood Smith et al.

(10) Patent No.: US 7,664,123 B2
(45) Date of Patent: Feb. 16, 2010

(54) GENERALIZED VIRTUAL ROUTER

(75) Inventors: Peter Ashwood Smith, Hull (CA);
Hamid Ould-Brahim, Kanata (CA);
Bilel Jamoussi, Nashua, NH (US);
Donald Fedyk, Groton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1061 days.

(21) Appl. No.: 10/763,015

(22) Filed: Jan. 22, 2004

(65) Prior Publication Data
US 2005/0163101 A1    Jul. 28, 2005

(51) Int. Cl.
*H04L 12/28* (2006.01)
(52) U.S. Cl. .................. 370/401; 370/392

(58) Field of Classification Search ............. None
See application file for complete search history.

(56) References Cited

U.S. PATENT DOCUMENTS

2003/0147402 A1*  8/2003  Brahim ............... 370/395.53
2004/0255028 A1* 12/2004  Chu et al. .................. 709/227
2006/0251419 A1* 11/2006  Zadikian et al. ............ 398/51

* cited by examiner

*Primary Examiner*—Duc C Ho
(74) *Attorney, Agent, or Firm*—Anderson Gorecki & Manaras LLP (57) ABSTRACT

A generalized virtual router is disclosed. A routing and switching apparatus includes a switching fabric and a matrix of switching and routing elements. At least some of the elements are interconnected by the switching fabric. A router control provides control for the switching fabric. The apparatus has both cross-connect and routing functionality.

7 Claims, 10 Drawing Sheets

GENERALIZED VIRTUAL ROUTER

FIELD OF THE INVENTION

This invention relates to virtual routers (VRs) and, in particular, a generalized virtual router (GVR) that is an IP-based layer-3 VR combined with the functionality of a virtual private packet/TDM/wavelength/fiber GMPLS-based cross-connect.

BACKGROUND OF THE INVENTION

While the use of multi-protocol label switching (MPLS) in core networks is well known, providing generalized multi-protocol label switching (GMPLS) within core networks is currently being explored.

GMPLS can be understood as follows. First, a label edge router (LER), a label switch path (LSP) and a label switch-router (LSR) are components within an MPLS network. LERs are routers on the edge of the network that attach labels to packets based on a forwarding equivalence class (FEC). An LSP is essentially the predetermined route that a set of packets bound to an FEC traverse through an MPLS network to reach their destination. Each LSP is unidirectional. An LSR is a router capable of forwarding packets according to a label switching algorithm. As opposed to LERs which can be found On the edge of the network, LSRs are found in the core of the network.

In terms of overall operation, incoming packets to an MPLS network are assigned a label by an LER. Packets are forwarded along an LSP where each LSR makes forwarding decisions based solely on the contents of the label. At each hop, the LSR strips off the existing label and applies a new label which tells the next hop how to forward the packet. GMPLS extends MPLS from supporting packet switching (PSC) interfaces and switching to include support of the following three classes of interfaces and switching: time-division multiplex (TDM), lambda switch (LSC) and fiber-switch (FSC).

A core network is a backbone network that provides any-to-any connections among devices on the network. Core networks are typically a combination of switching offices and a transmission plant connecting switching offices together. Many core networks include multiple ATM switches configured in a multi-linked mesh topology. Other core networks include IP routers. Yet another type of core network includes Synchronous Optical Network (SONET)/Synchronous Digital Hierarchy (SDH) Optical-Electrical-Opticals (OEOs) with routers at the edge. Providers associated with any of these types of core networks typically offer a limited range of services to customers.

United States Patent Application Publication 2003/0147402 A1 discloses a provider network offering multi-service virtual private cross-connect (VPxC). The VPxC can appear to a customer network as a virtual node within the network and may be addressed using a client addressing scheme. A VPxC can also use techniques associated with a virtual private optical cross-connect (VPOxC), with the exception that the VPxC m ay a lso accommodate packet-based links, such as IP, ATM, Ethernet or other packet-based links (a VPxC is a Generalized Virtual Private Cross-Connect). In a Provider Provisioned Virtual Private Service Network, a VPxC may provide packet-based layer-2, layer-3 and GMPLS-based Optical/TDM virtual private network (VPN) services where the concept of GMPLS-based Virtual Private optical/TDM cross-connect may be extended to include packet-based VPNs. The VPxC may also use technology developed in provider provisioned virtual private networks (e.g., layer-3, layer-2, OVPNs) such as VPN auto-discovery used for VPOxC and generalized VPN (GVPN) as applied to layer-2 circuits, for example. A provider network offering VPxC services can include devices such as optical cross-connects, routers, ATM, Frame Relay or Ethernet switches, SONET/SDH cross-connects and other similar devices.

A VR has different functionality than a VPxC. A VR is an emulation of a physical router at the software and hardware levels. Furthermore, a VR has the same mechanisms as physical routers, and can therefore be used to provide layer-3 VPN services. Each VR can run any routing protocols (OSPF, RIP, BGP-4). VR-based mechanisms include VR using Border Gateway Protocol (BGP) (see Hamid Ould-Brahim et al. "Network based IP VPN Architecture using Virtual Routers," July 2002, available at the Internet Engineering Task Force web site) or VPNs based on RFC 2547bis (often referred to as BGP/MLPS-based VPNs) (see Eric Rosen et al., "BGP/MPLS VPNs" available at the Internet Engineering Task Force web site). A VR and 2547 are only capable of IP. 2547 cannot support either MPLS or GMPLS over its networks. A VR does not implement in general a VPxC type switching and control plane.

It would be desirable to provide a GVR which combines the functionality of a VR and a VPxC.

It would also be desirable to provide a GVR that can be used to provide layer-3 services, as well as layer-1 services such as optical/TDM VPNs.

The GVR should be able to run routing protocols such as OSPF, RIP and BGP-4, and the GVR should support GMPLS.

When instantiated on a network-level, a GVR should be able to implement a VPN auto-discovery mechanism. Instantiation of the GVR on a single or multiple physical network nodes should be possible.

It would be desirable if the GVR could be logically/physically interconnected to build virtual private, routed switched networks.

Possible interfaces for the GVR should include both packet and optical/TDM interfaces, and the interfaces should be GMPLS-based, thus inheriting all GMPLS link constructs such as link bundling, unnumbered and numbered, to name a few.

The GVR should be a building block for a carrier wishing to sell a complete virtual network.

In view of the foregoing, it would be desirable to provide a generalized virtual router which overcomes the above-described inadequacies and shortcomings.

SUMMARY OF THE INVENTION

An object of the present invention is to provide an improved virtual router that combines layer-3, layer-2 and layer-1 routing and switching functionalities.

According to a first aspect of the present invention, there is disclosed a routing and switching apparatus that includes a switching fabric and a matrix of switching and routing elements. At least some of the elements are interconnected by the switching fabric. A router control provides control for the switching fabric. The apparatus has both cross-connect and routing functionality.

According to one embodiment, the apparatus can support GMPLS and it can also provide layer-3 VPN services.

According to another aspect of the invention, there is disclosed a fabric card for use in a routing and switching apparatus. The fabric card includes a circuit board, a switching fabric, and a matrix of switching and routing elements attached to the circuit board. At least some of the elements are interconnected by the switching fabric.

In a related embodiment, a CLOS architecture is employed, and the fabric card further includes a fabric control processor attached to the circuit board.

According to yet another aspect of the invention, there is disclosed a method for operating a router including the steps of:

(1) using a primary router to direct an electrical signal to a virtual router that runs GMPLS; and (2) using the virtual router to perform virtual router functions.

In a related embodiment, the virtual router supports a combination of at least two of layer-2 switching Ethernet, layer-2 switching MPLS, and layer-3 forwarding via a network processor.

Further features and advantages will become apparent from the following detailed description taken in conjunction with the accompanying drawings.

DETAILED DESCRIPTION

Figure 1:
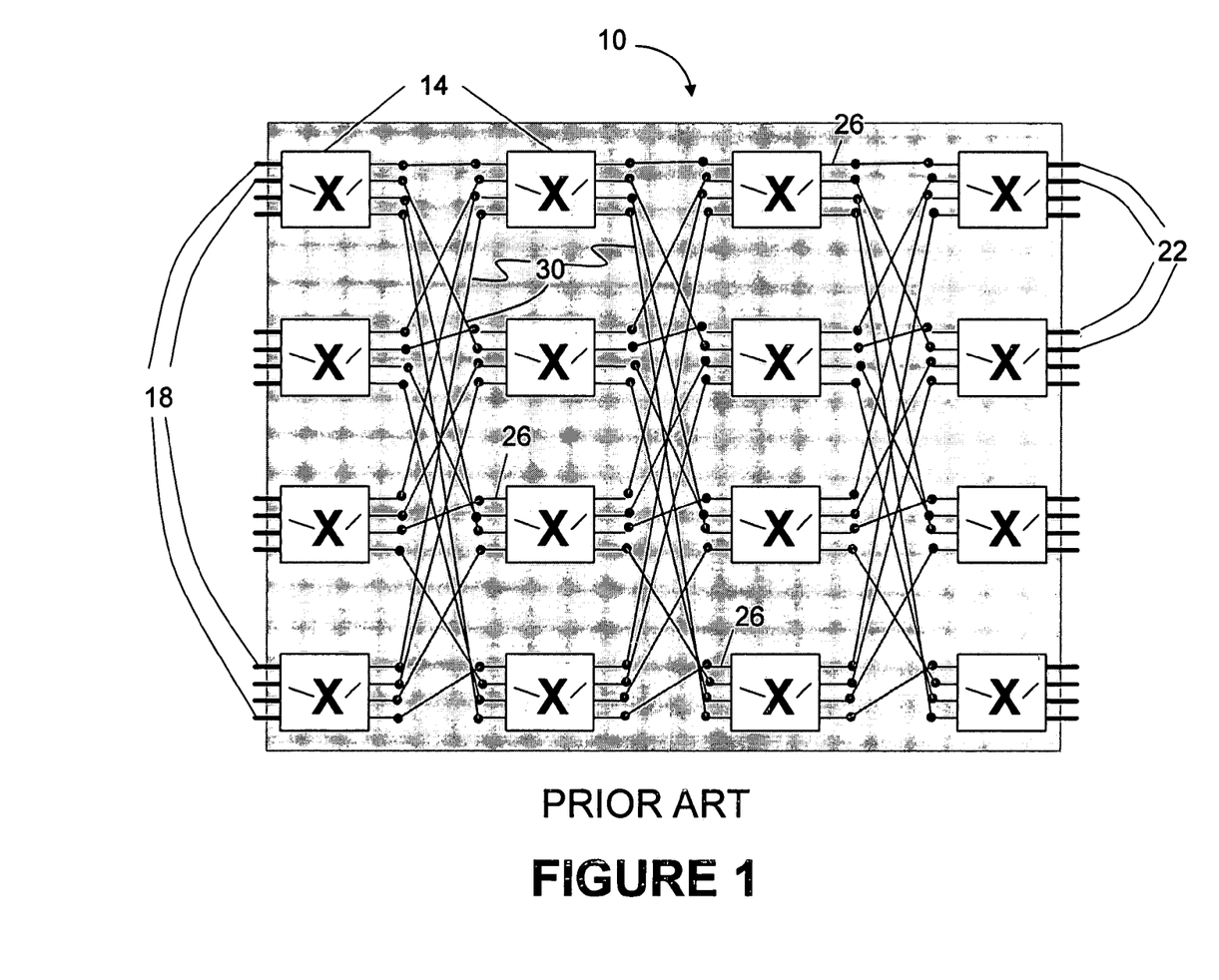
FIG. 1 is a schematic diagram of a SONET/SDH switch in accordance with the prior art.

FIG. 1 illustrates a SONET/SDH switch 10. The switch 10 includes a matrix of smaller switching elements 14. An example of the switch 10 would be an optical cross-connect switch having a CLOS architecture (named after an inventor named Charles Clos).

The concept of an N×N cross-connect is understood by those skilled in the art. It is a switch fabric that can switch a signal from any N transmission lines to another N transmission lines. Cross-connects include multiple input and/or output ports.

Many types of optical switches are known to those skilled in the art. An OEO switch is a type of optical switch. An OEO switch changes an optical signal into electrical and performs switching before changing the signal back to optical. An important feature of OEO switches for TDM services is the ability to extract lower-speed circuits from Optical Channel (OC)-48/192 channels and electronically switch them from any port to any port.

Conversion of light into electrical signals is important in the context of the Internet. To transmit an optical signal to the right destination location, the router must know what the correct destination is. To determine the right destination the router must read the information. To do this, the router must convert the optical data to an electrical data packet for packet analysis.

A synchronous transport signal-48 (STS-48 is an example of a signal that could be sent through the switch 10. This type of signal is an electrical signal. The number 48 refers to the bit-rate of the signal and, more specifically, the bit-rate of the signal would be 48×51.84 Mbits/s. Different signals can be sent along different paths through the matrix because pathways 30 create many different paths through the matrix.

The switch 10 allows multiple connections at one time. Perhaps 40 STS-48 signals might be sent through the switch 10 at one instance in time. The switch 10 has multiple external ports including external ports 18 and external ports 22. Also there are additional ports 26 within the matrix of the elements 14. Signals travelling through the switch 10 can enter through the external ports 18, travel along the pathways 30 through four different switching elements 14, and finally leave through the external ports 22.

It is typical to find a midplane architecture for interconnecting circuit boards in modern routers. In this midplane architecture, a set of port circuit boards connects to a set of switching circuit boards through a midplane. The midplane is itself a circuit board with two main surfaces. The port circuit boards are mounted to one main surface of the midplane while the switching circuit boards are mounted to the other surface of the midplane. The midplane establishes electrical pathways between the main surfaces such that data signals from the port circuit boards can travel to the switching circuit boards. Where STS signals are involved, the switching layer can permit the distribution of STSs to network processing layers and back out.

Figure 2:
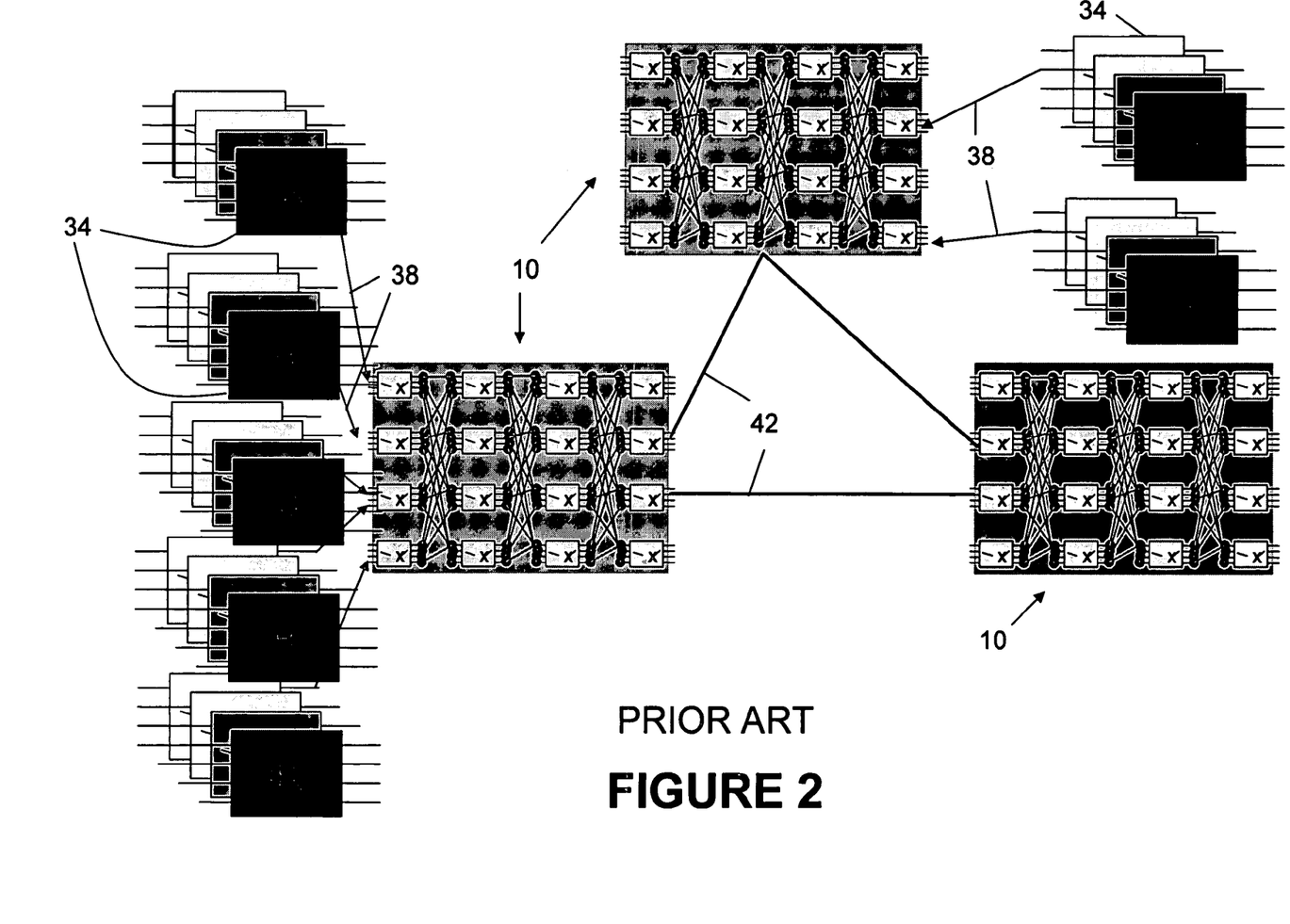
FIG. 2 is a schematic diagram of SONET/SDH switches used in combination with routers in accordance with the prior art.

FIG. 2 shows the switches 10 being connected to routers 34 in a known arrangement. The routers 34 direct signals to the switches 10 via paths 38. Signals can also pass between the switches 10 as indicated by paths 42. Signals along the paths 38 and the paths 42 are electrical.

The arrangement of routers and switches illustrated in FIG. 2 results in a large number of independent router networks and, therefore, a large number of virtual routers. Each virtual router has high connectivity and, in terms of bandwidth use, is operating inefficiently.

A GLSR is a hybrid device that can instantiate virtual routers and interconnect them to and from any input port, timeslot or fiber. In this manner, a GLSR network can create a virtual subnetwork of virtual routers.

Figure 3:
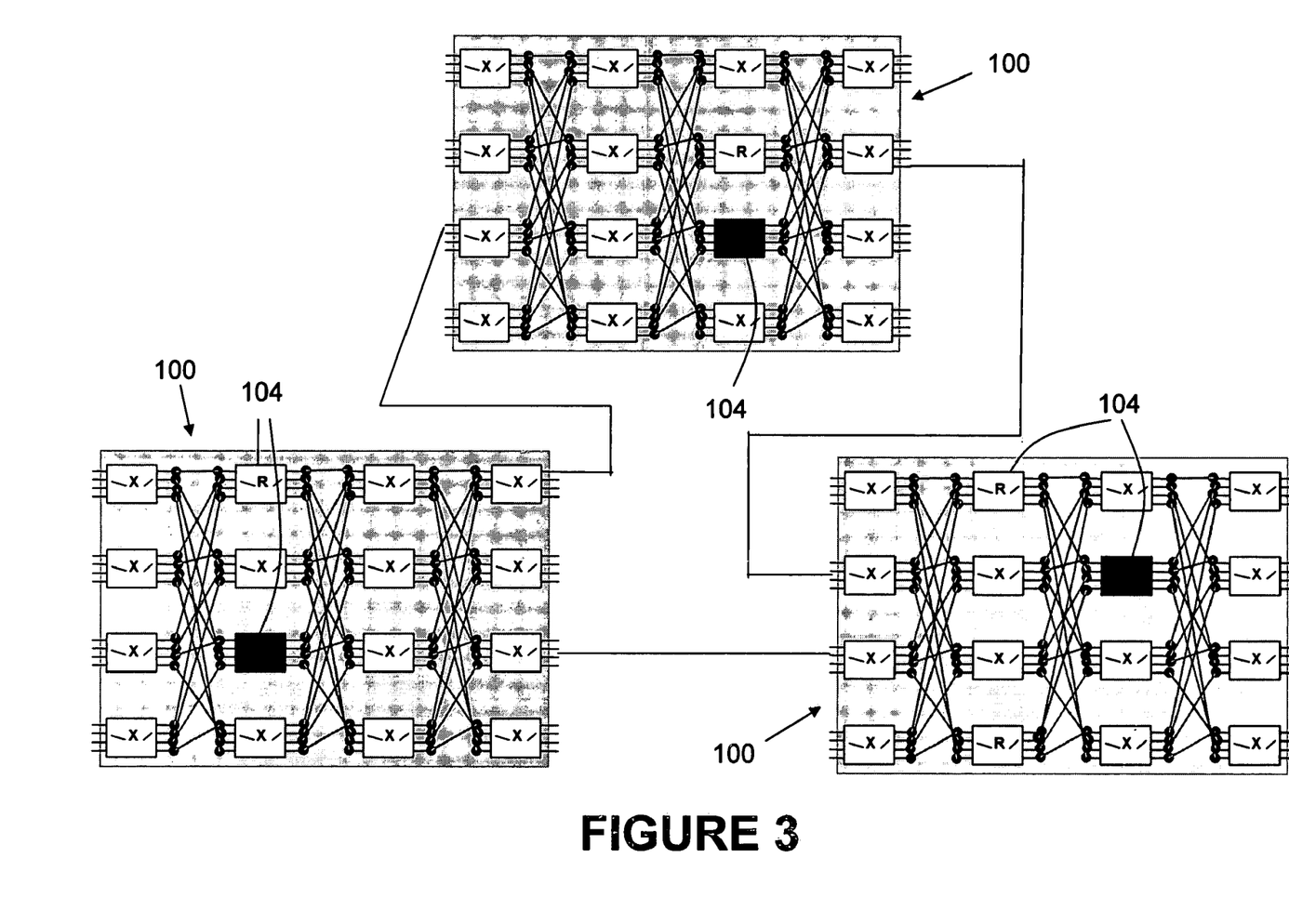
FIG. 3 is a schematic diagram of generalized label-switched routers (GLSRs) in accordance with an embodiment of the invention.

Interconnected GLSRs 100 are illustrated in FIG. 3. The GLSRs 100 introduce routing into a switching fabric at various points. Referring to FIG. 1, switching elements 14 have been replaced at various locations 104 with routing elements. This change reduces switching capacity, but it adds routing via midplane to the optical switch architecture. The routing can be bypassed. Columns in the matrix of switching and routing elements which have routing elements are not exclusively composed of routing element. A row of network processors can be added to the router 100. Each network processor can route on inputs or pass-through.

Figure 4:
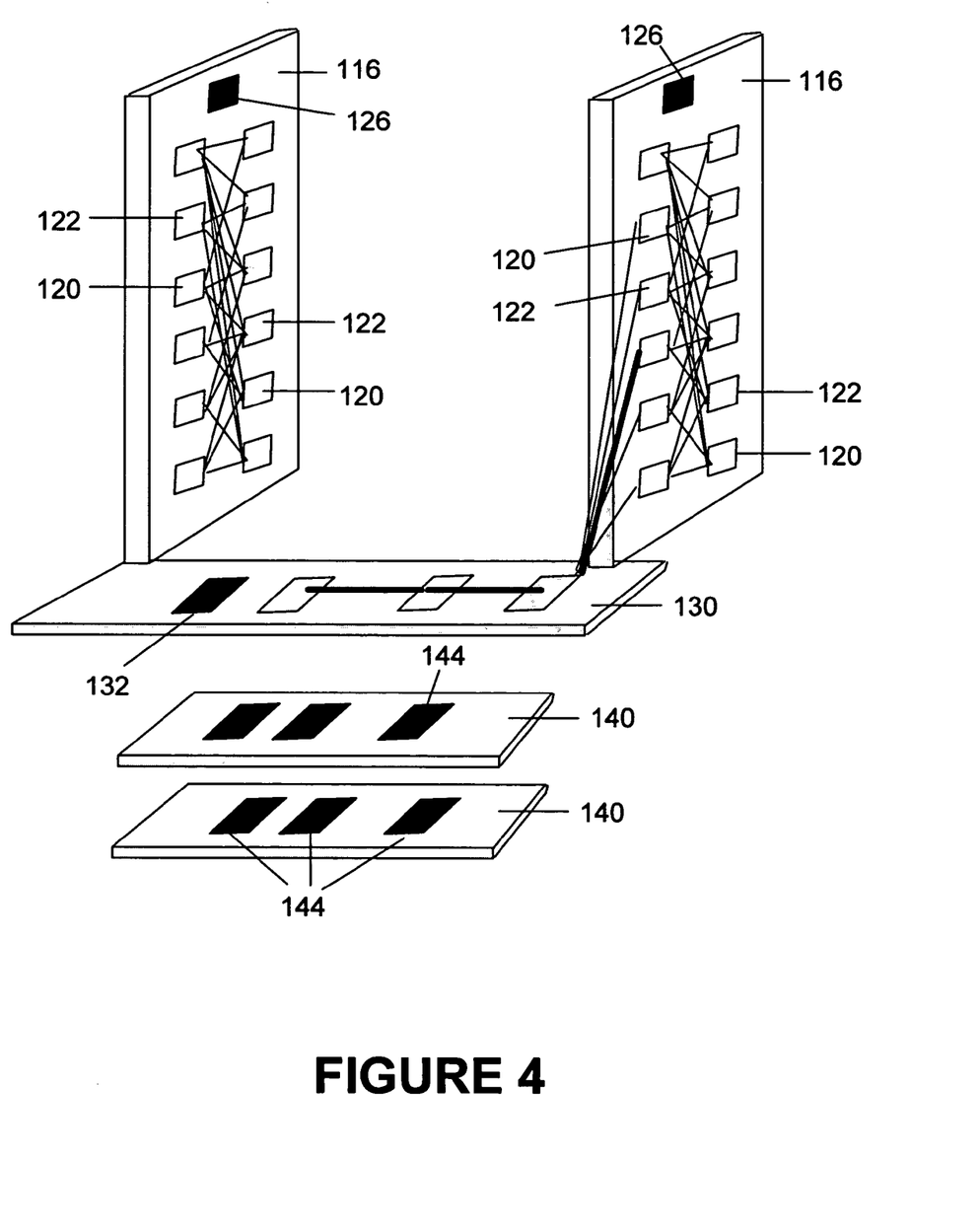
FIG. 4 is a perspective view of cards used in a GLSR architecture in accordance with an embodiment of the invention.

Cards which can be used to implement a GLSR architecture are shown in FIG. 4. Fabric cards 116 have a CLOS architecture and include a network processor mesh. Some elements in the matrix of the cards 116 are routing elements 120. Other elements in the matrix are switching elements 122. Depending on what is desired, the manufacturer of these cards could make them with mostly switching elements, mostly routing elements, or a variable mix.

The fabric cards 116 also have fabric control processors 126 in a given embodiment. Known control processors for switch fabric cards include functionality to configure the card, monitor switch state, control switch fabric switchover and control switch resources. The processors 126 program a variable number of connections (i.e. bandwidth control). The processors 126 also program the network processors.

Working in conjunction with the fabric cards 116 is an input/output (I/O) card 130. The card 130 includes a packet handler interface (PHI), switches, and a network processor. In a wireless embodiment one or more digital signal processors (DSPs) would be used instead of a network processor. I/O card processor 132 includes a PHI and smaller switch elements.

Control processor cards 140 are for redundancy and load sharing. Each of the cards 140 have multiple processors 144.

Figure 5:
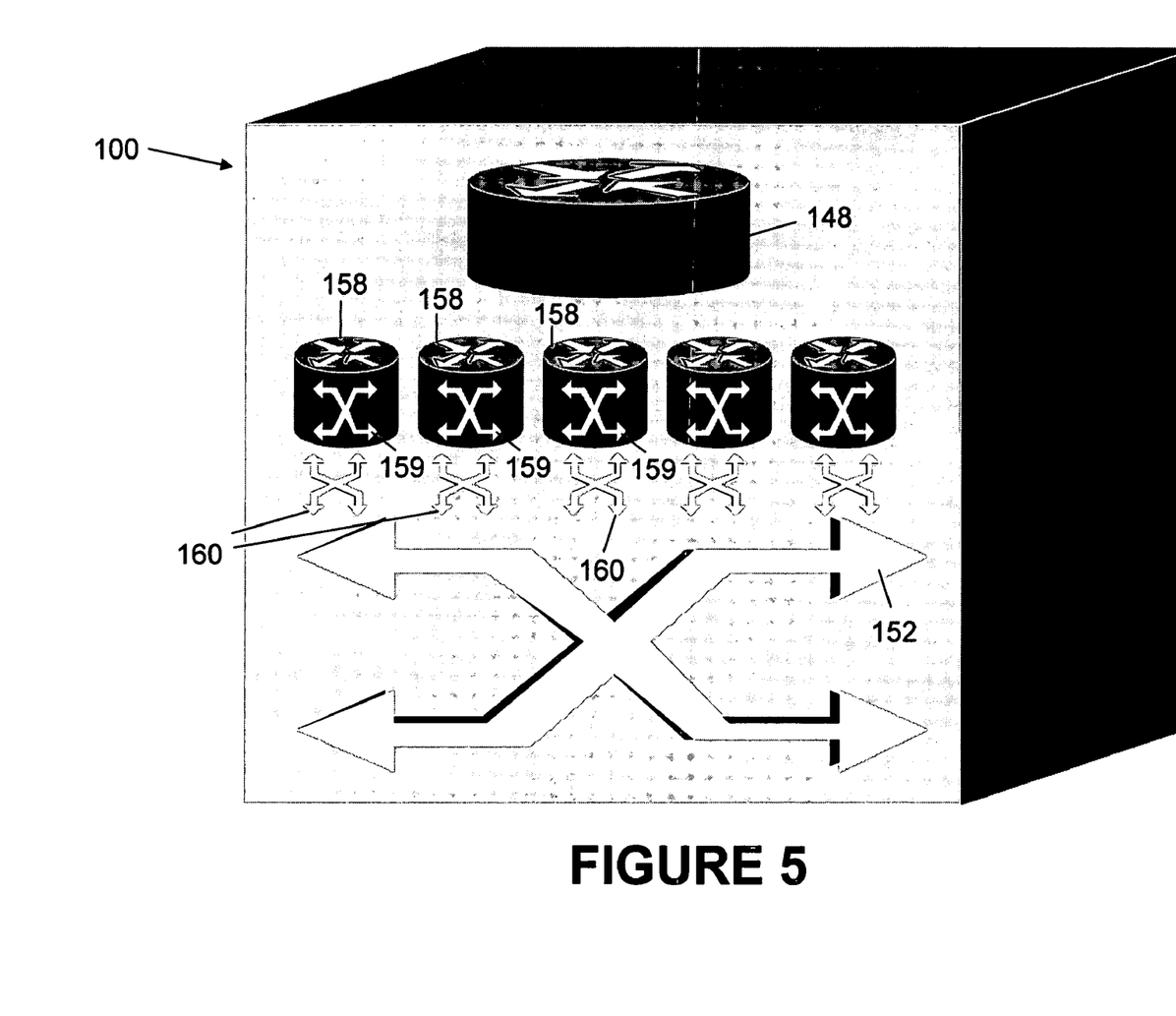
FIG. 5 is a diagram of a GLSR in accordance with an embodiment of the invention.

The internal operation of a particular GLSR is illustrated in FIG. 5. Router 148 runs GMPLS and controls a main switching fabric 152. The switching fabric 152 can connect inputs to outputs as per normal SONET. Alternatively, the switching fabric 152 can terminate or originate signals at GVRs. Switching fabrics 160 and the switching fabric 152 are shown in the diagram. Physically speaking though, there are not multiple switching fabrics. Switching fabric 152 and switching fabrics 160 are subsets of the switching fabric of the GLSR 100. Switching fabric is a term known to those skilled in the art as a means for permitting a signal from any input port to be coupled to any output port.

Smaller routers (GVRs) 158 also run G MPLS and control the switching fabrics 160. The GVRs 158 have routing paths 159. Furthermore, the GVRs 158 are embedded in the GLSR 100.

Each of the GVRs 158 is a combination of a VR and a VPxC. A GVR is an IP-based layer-3 VR combined with the functionality of a virtual private packet/TDM/wavelength/fiber GMPLS-based cross-connect. Connection to and from the GVR is through IP and/or optical/TDM routing/switching capable logical ports. Signals within the GVR can be routed and layer-3 forwarded, or they can be layer-1 switched. It will be appreciated by one skilled in the art that where reference is made to layer-1 in this detailed description, layer-0 (i.e. optical layer) may be a substitute or addition to layer-1 where appropriate.

A GVR is to be distinguished from a generalized virtual switch (GVS). A GVR combines the functionality of a VR and a VPxC, while a GVS combines a virtual layer-2 switch and a VPxC. More specifically, a GVS is a frame/cell layer-2 virtual switch (FR, ATM, Ethernet, high-level data link control, etc.) combined with the functionality of a virtual private packet/TDM/wavelength/fiber GMPLS-based cross-connect. Connection to and from the GVS is through layer-2 and/or optical/TDM routing/switching capable logical ports. Signals within the GVS can be layer-2 switched (routed), or they can be layer-1 switched.

GVR and GVS functionality can be combined to provide a layer-3, layer-2 and layer-1 virtual node. The combination is called a generalized virtual node (GVN). All concepts and mechanisms defined for GVR and GVS are applicable to GVNs, and a GVN may use one instance of VPxC (one VPxC can support both GVS and GVR). Connection to and from the GVN is through one or more of the following routing/switching capable interfaces: layer-3, layer-2, layer-1. Signals within the GVN can be layer-2 switched (routed), routed and layer-3 forwarded, or they can be layer-1 switched.

Figure 6:
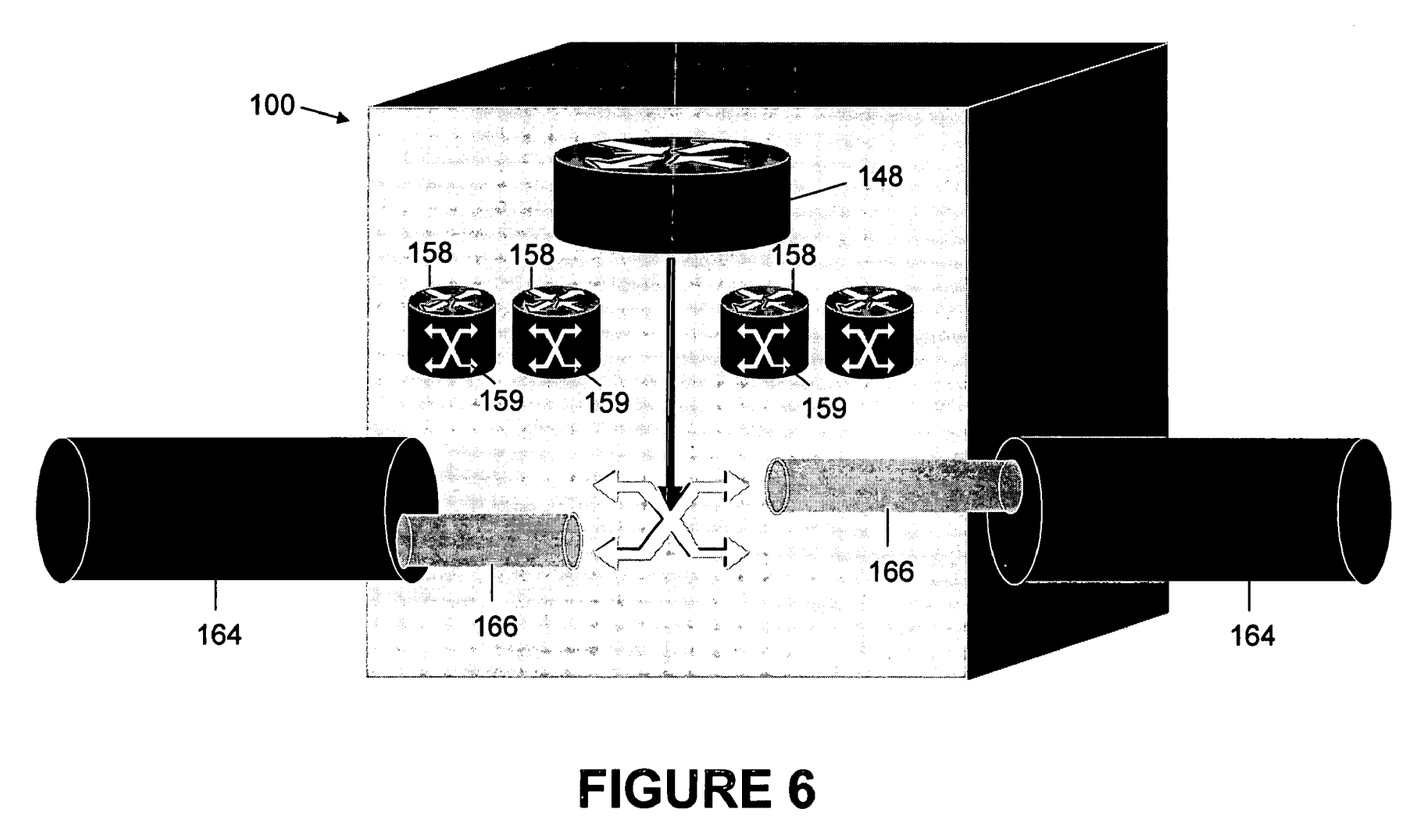
FIG. 6 is a diagram of the GLSR of FIG. 5 depicting direct switching under top-level GMPLS router control according to an embodiment of the invention.

Direct switching from input to output within the router 100 is illustrated in FIG. 6. OC-Ns 164 carry optical signals. OC-N is the optical equivalent of the electrical transport provided by STS. The OC standards are incremental increases in data rates relative to OC-1 at 51.84 Mbits/sec. The current levels of OC-1, OC-3, OC-12, OC-48 and OC-192 are specifically at 51.84 Mbits/sec, 155.52 Mbits/sec, 622.08 Mbits/sec, 2.48832 Gbits/sec, and 9.95328 Gbits/sec (or 10 Gbits/sec for simplicity). Prior to OC, data had been transmitted through fiber optical cable using TDM which sends signals representing data divided by slices of time. For TDM, a single optical fiber could carry only one data signal at a time.

Thus there is optical transport outside of the GLSR 100, and there is electrical transport inside the GLSR 100. In this respect, the similarity between the GLSR 100 and known OEO switches is clear.

With respect to electrical transport, STS-Ms 166 are manipulated within the GLSR 100. The router 148 in this diagram provides top level GMPLS router control to directly switch the STS-M 166 from the input to the output.

Figure 7:
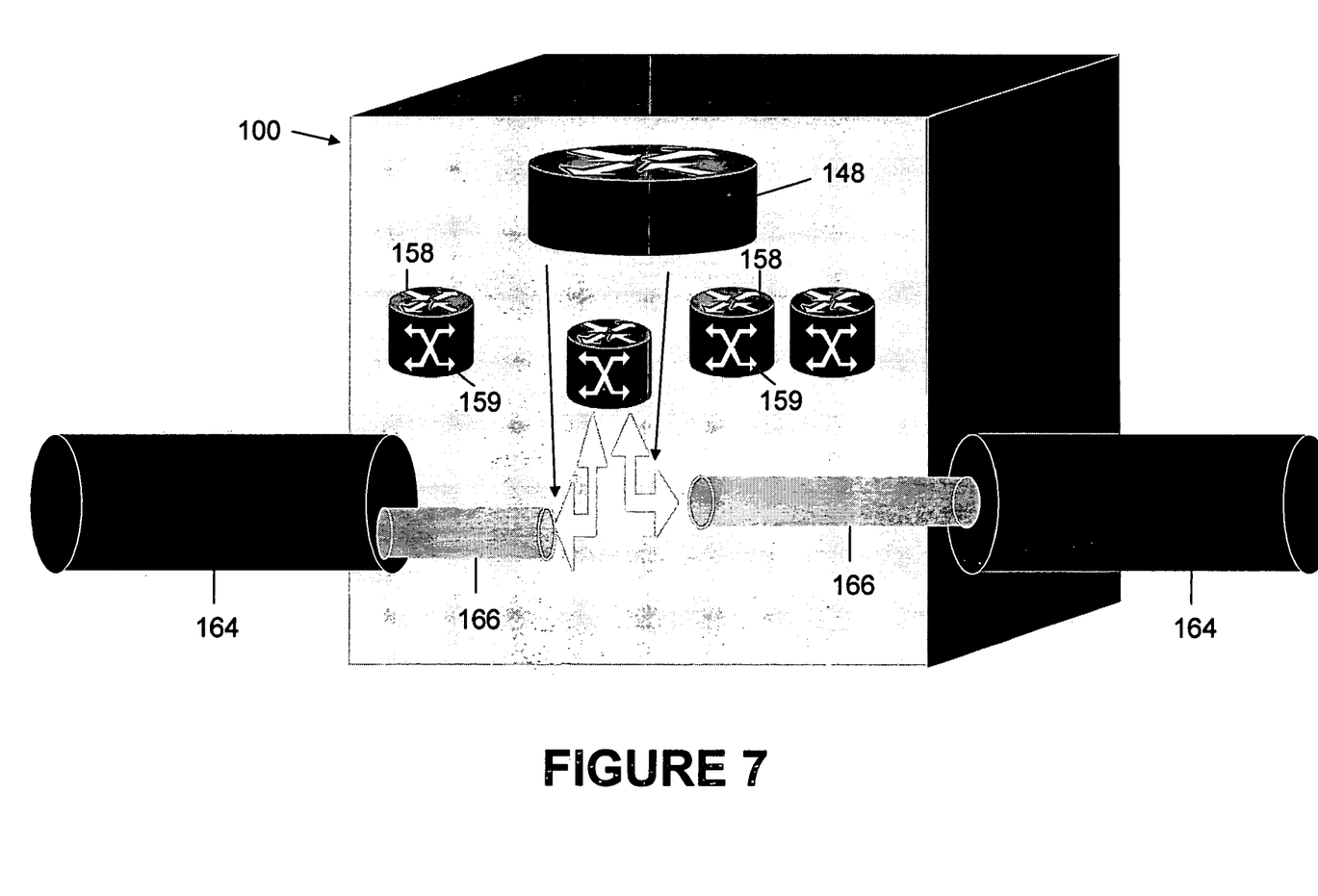
FIG. 7 is a diagram of the GLSR of FIG. 5 depicting signal direction to and from a GVR according to an embodiment of the invention.

In FIG. 7, the router 148 directs the STS-M 166 to the router 158. The router 158 can do layer-2 switching Ethernet, layer-2 switching MPLS, or layer-3 forwarding via a network processor. As illustrated, the STS-M 166 can be directed both to and from the router 158.

Figure 8:
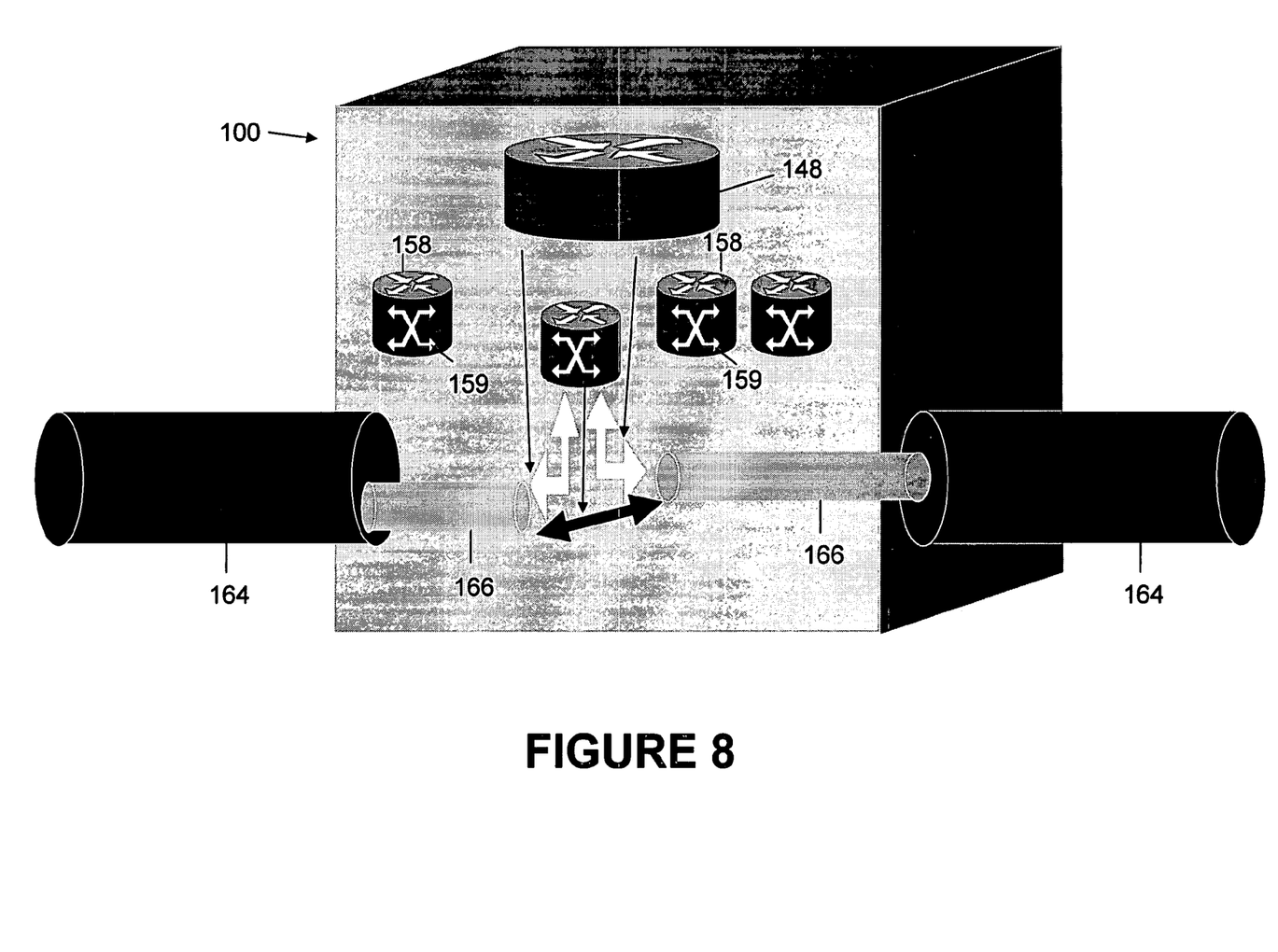
FIG. 8 is a diagram of the GLSR of FIG. 5 depicting a combination of direct switching and signal direction according an embodiment of the invention.

FIG. 8 is a diagram depicting a combination of direct switching and signal directing. The router 158 directly cross-connects a subset of the STS-M 166 using GMPLS. Another subset of the STS-M 166 is directed to and from the router 158. Again, with respect to the latter subset, the router 158 can do layer-2 switching Ethernet, layer-2 switching MPLS, or layer-3 forwarding via a network processor.

The GLSR 100 can vary the amount or ratio of switching and routing capacity. One or more of the GVRs 158 can be added or removed. Referring to FIG. 5, one or more of the switching fabrics 160 can be added or removed.

The GLSR 100 can implement switching or routing protocols as a virtual network. For example, the router 100 can implement ATM or Private Network-to-Network Interface (PNNI) totally isolated from all other protocols.

A GLSR can instantiate GVRs and interconnect them. Therefore, a network of GLSR type elements can implement an arbitrary network of GVRs.

A GLSR network can increase or decrease the bandwidth on any segment of any GVR network. More STS signals can be made available to the network's GMPLS label bases while in mid-progress (i.e. a make-before-break mechanism adjusts links between GVRs).

A GLSR network can also instantiate a switched Ethernet where the top level tree segments are created by GMPLS. Segment sizes can vary. Intermediate switching points can be instantiated (not just at the edge).

Figure 9:
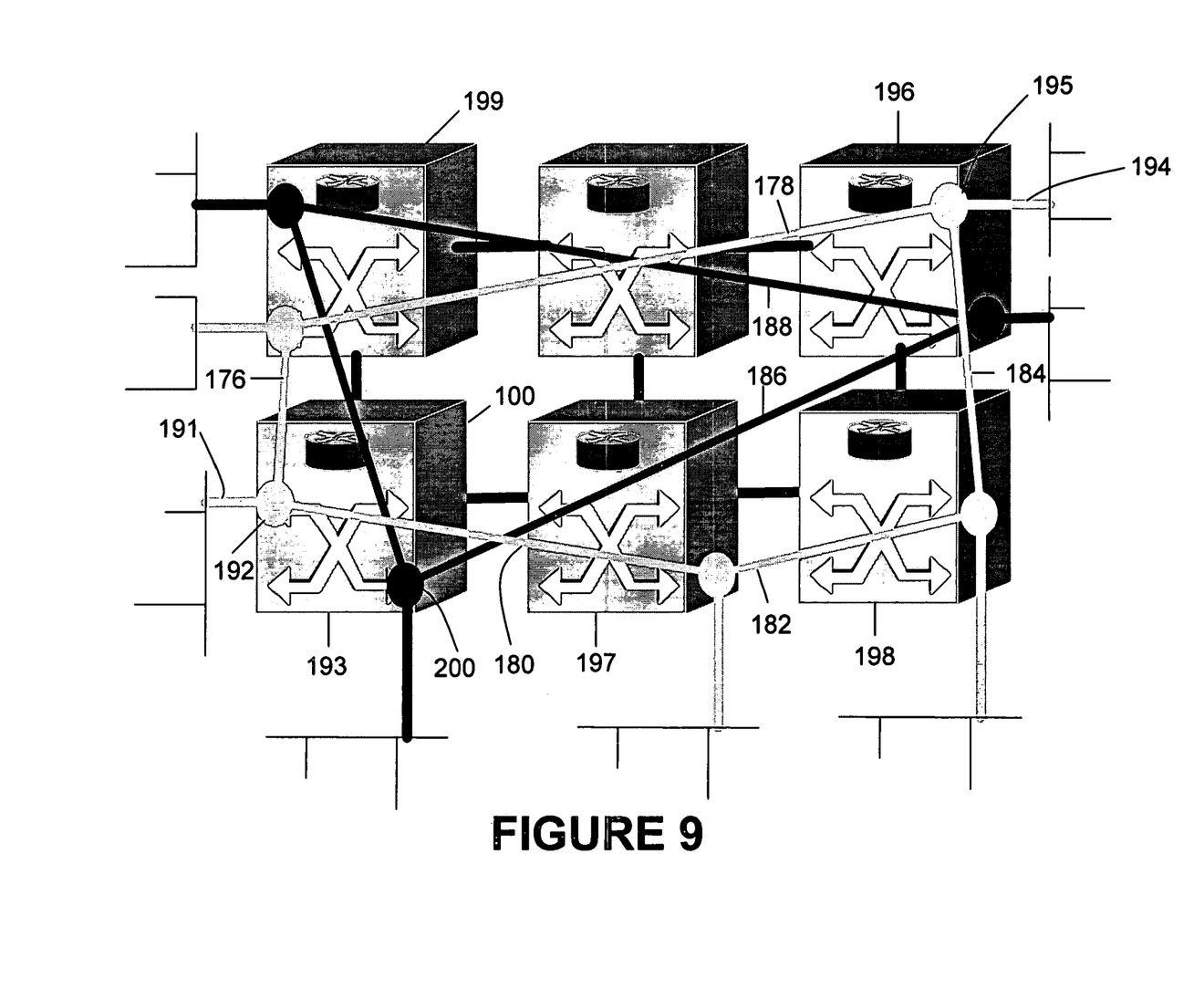
FIG. 9 is a diagram of a GLSR network depicting virtual ring functionality according to an embodiment of the invention.

FIG. 9 shows how a GLSR network can instantiate virtual rings. The rings can be any of the GMPLS transport types. Each of the line segments forming the rings represents an individual LSP. These LSPs can be grown, shrunk, or moved as necessary. Make-before-break mechanisms can be used to minimize loss during ring contraction or expansion. In a make-before-break mechanism, a second path is established for a given connection while an earlier established path continues to carry data for the given connection. If the second path is successfully established, the given connection is switched from the first path to the second path. The first path is then destroyed leaving only the second path.

The diagram illustrates two rings. The first ring is formed by the line segments 176, 178, 180, 182 and 184. The second ring is formed by the line segments 186, 188 and 190. This two ring topology is referred to as a dual-ring topology.

When transport is SONET/SDH, the behaviour of the GLSR network is similar to a resilient packet ring (RPR). RPR is a fiber-optic packet network that provides protection against faults. RPR implements a dual-ring topology in which one cable waits in standby mode to handle traffic in the event of a fault.

The RPR behaviour similarity can be understood by the following example. An OC-N on path 191 enters the GLSR network at port 192 of GLSR 193. The corresponding exit from the network of the OC-N onto path 194 is through port 195 of GLSR 196. Between the ports 192 and 195 i.e. within the GLSR network it is entirely electrical transport. One means for STS-M signals at the router 193 to get to the router 196 is along the ring formed by the line segments 176, 178, 180, 182 and 184. Using this ring, the STS-M signals could go from the GLSR 193 to GLSR 197, then to GLSR b, and finally to the GLSR 196. Alternatively, the STS-M signals could go from the GLSR 193 to GLSR 199, and then to the GLSR 196. Traffic engineering mechanisms known to those skilled in the art apply in this situation.

If however there is a failure in the ring, the STS-M signals can also get from the router 193 to the router 196 along the ring formed by the line segments 186, 188 and 190. First the GLSR 193 directly switches the STS-M signals from the port 192 to port 200 under top level GMPLS router control. The STS-M signals could then go to the GLSR b. Alternatively, the STS-M signals could go from the GLSR 193 to GLSR 199, and then to the GLSR 196.

It will be appreciated by one skilled in the art that the functionality associated with a bi-directional network ring topology can be realized for the above-described ring despite each LSP being unidirectional. Bi-directional network ring topologies provide efficient bandwidth utilization by enabling data to be transferred between any pair of nodes in either direction a round the ring, while maintaining fast protection against faults. The two opposing traffic directions in a bi-directional ring topology are commonly referred to as an inner ring and an outer ring.

Figure 10:
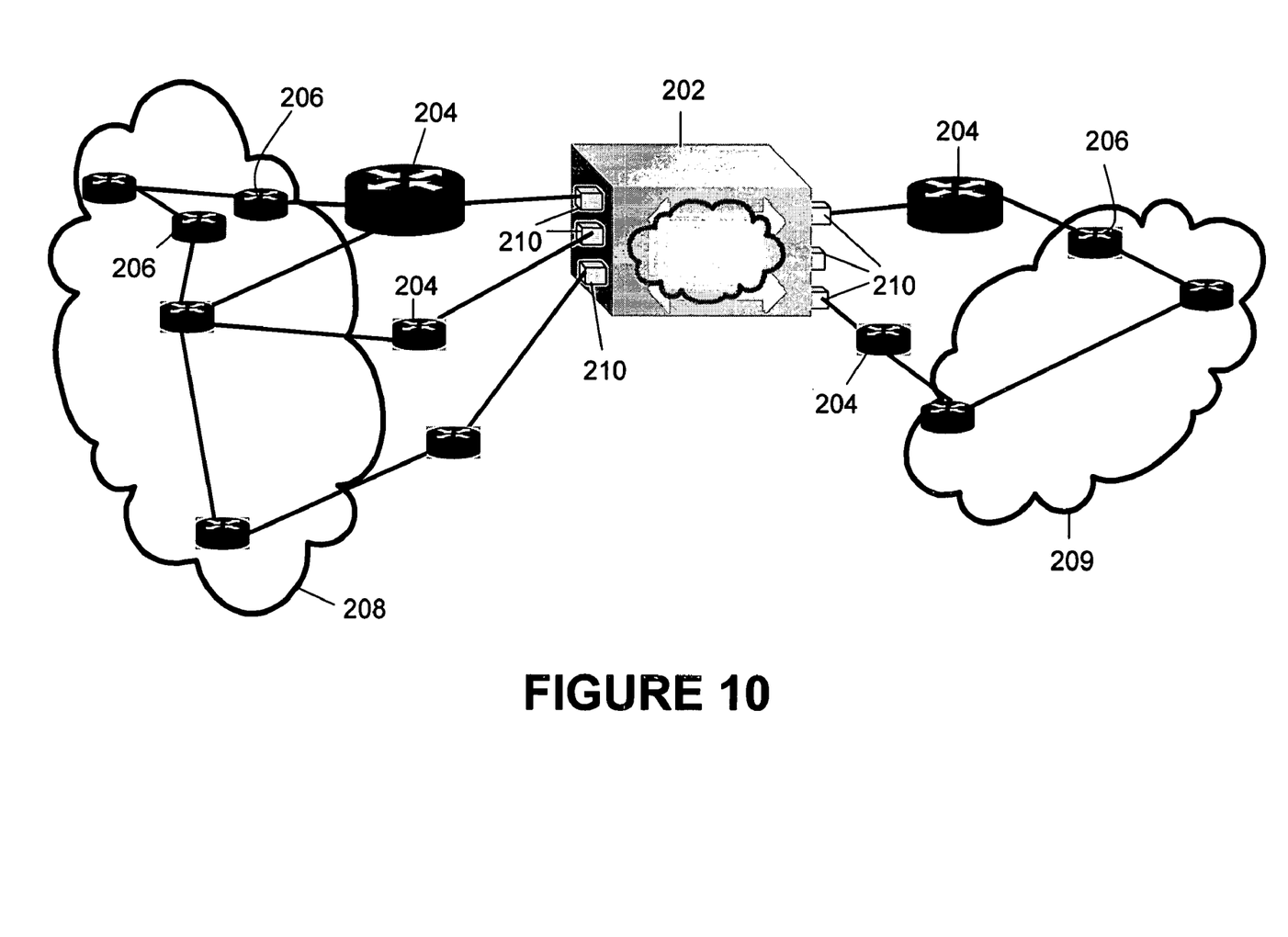
FIG. 10 is a diagram of a network within which an embodiment of the invention can be used.

A network incorporating a GVR 202 is illustrated in FIG. 10. The GVR 202 is capable of implementing a VPN auto-discovery mechanism. The GVR 202 could alternatively be a GVS or a GVN. Client edge devices 204 are directly connected to ports of the GVR 202. Other client devices 206 are not directly connected to any ports of the GVR 202. First location VPN 208 includes the client devices 204 and 206 on one side of the GVR 202. Second location VPN 209 includes the client devices 204 and 206 on another side of the GVR 202. The devices 204 and 206 can each have unique addresses within the network. The GVR 202 may, however, have several addresses associated with each of the inputs and outputs 210. The first three decimals of the addresses for all of these devices could be same.

A GVR may include multiple provider-edge devices. In this scenario, the particular GVR could be instantiated in one node, and one of the multiple provider-edge devices would be directly connected to one or more client edge devices through a GMPLS interface. One or more VPNs would be connected to a provider network by these client edge and provider edge devices. Different types of VPNs, such as layer-2 and layer-3, can be built using GVRs.

A provider having a network of GLSRs can use GMPLS protocol at two levels. The first level can be used to instantiate pipes between the GVRs. The second level can be used between the GVRs to instantiate connections. Theoretically this recursion could continue indefinitely, but practically three levels are more than needed. It may be of assistance in understanding a GVR to categorize it as a virtual GLSR.

A provider can use a network of GVRs to provide VPN services to a customer having geographically spaced apart network locations. Each location would interface with the network of GVRs through at least one client edge device. A particular client edge device could interface with one or multiple GVRs.

In one embodiment of the invention, the GVR is capable of running routing protocols such as OSPF, RIP and BGP-4.

Interfaces for the described GVR can be GMPLS based interfaces. Therefore the GVR inherits all GMPLS link constructs such as link bundling, unnumbered, numbered, etc.

When instantiated on a network-level, a GVR can implement a VPN auto-discovery mechanism. Instantiation of a GVR on a single or multiple physical network nodes is possible in a preferred embodiment of the invention.

A GVR network set up can give a customer a complete routed network.

| Glossary of Acronyms Used |
| --- |
| FEC—forwarding equivalence class |
| GLSR—generalized label switch router |
| GMPLS—generalized multi-protocol label switching |
| GVN—generalized virtual node |
| GVR—generalized virtual router |
| GVS—generalized virtual switch |
| I/O—input/output |
| LER—label edge router |
| LSP—label switch path |
| LSR—label switch router |
| MPLS—multi-protocol label switching |
| OC—optical channel |
| OEO—optical-electrical-optical |
| PHI—packet handler interface |
| SDH—Synchronous Digital Hierarchy |
| SONET—Synchronous Optical Network |
| STS—synchronous transport signal |
| TDM—time-division multiplex |
| VPOxC—virtual private optical cross-connect |
| VPN—virtual private network |
| VPxC—virtual private cross-connect |
| VR—virtual router |

While the invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A routing and switching apparatus comprising:
   a switching fabric;
   a matrix of switching elements and routing elements arranged in a CLOS architecture, at least one of said switching elements being connected to at least one of said routing elements by said switching fabric; and
   router control providing control for said switching fabric, wherein said apparatus has both cross-connect functionality and routing functionality.

2. The apparatus as claimed in claim 1 wherein said apparatus can support generalized multi-protocol label switching.

3. The apparatus as claimed in claim 2 wherein said apparatus can provide layer-3 virtual private network services.

4. The apparatus as claimed in claim 3 wherein said apparatus can exist both physically and virtually within a particular network.

5. The apparatus as claimed in claim 3 further comprising a router capable of forwarding packets according to a label switching algorithm.

6. The apparatus as claimed in claim 1 wherein said apparatus further comprises an internet-protocol-based layer-3 virtual router.

7. The apparatus as claimed in claim 2 wherein said apparatus can perform layer-3 forwarding via a network processor.

* * * * *

UNITED STATES PATENT AND TRADEMARK OFFICE
CERTIFICATE OF CORRECTION

PATENT NO. : 7,664,123 B2
APPLICATION NO. : 10/763015
DATED : February 16, 2010
INVENTOR(S) : Ashwood Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1732 days.

Signed and Sealed this

Thirtieth Day of November, 2010

David J. Kappos
*Director of the United States Patent and Trademark Office*